Jan. 11, 1938.   A. W. ANDERSON   2,104,962
FRICTION CLUTCH
Filed Aug. 24, 1936    2 Sheets-Sheet 2

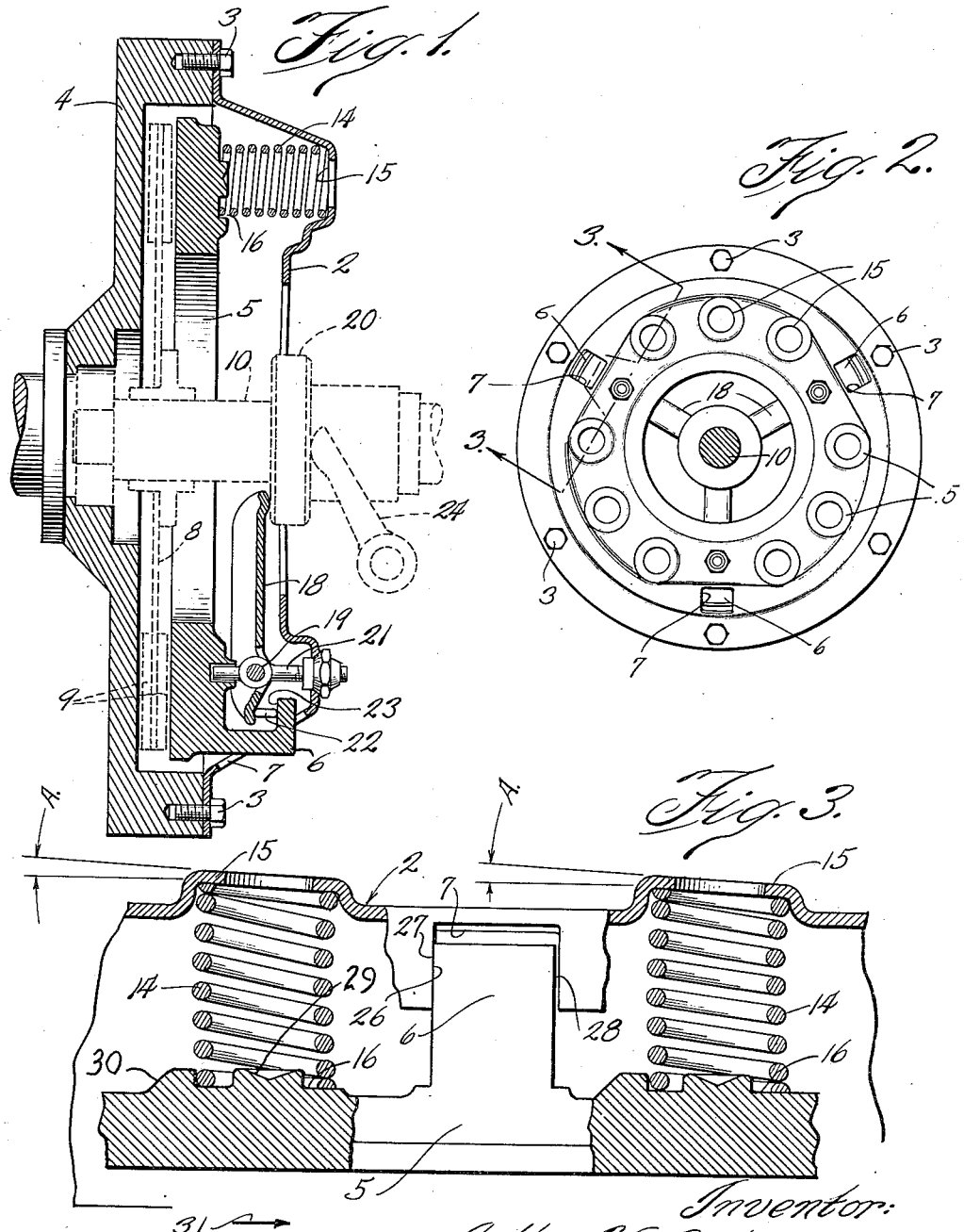

Inventor:
Arthur W. Anderson
By Edward C. Fitzhugh
Atty.

Patented Jan. 11, 1938

2,104,962

UNITED STATES PATENT OFFICE 2,104,962

FRICTION CLUTCH

Arthur W. Anderson, Chicago, Ill., assignor to Borg-Warner Corporation, Chicago, Ill., a corporation of Illinois Application August 24, 1936, Serial No. 97,509

5 Claims. (Cl. 192—68)

This invention relates to improvements in friction clutches and more particularly to the pressure plate spring and cover elements of the driving assembly of a friction clutch.

In the construction of friction clutches for motor vehicles, it is a common expedient to mount the pressure plate, which is adapted frictionally to engage the facing of the driven clutch disc, within the cover assembly of the clutch, the cover being fashioned for mounting directly upon the fly wheel of the vehicle engine. In order properly to establish torque drive between the cover and the pressure plate, lugs are formed upon the pressure plate or pins are fixed thereto, which lugs or pins extend partially through openings, or slots, formed in the adjacent wall of the cover plate. This construction permits axial movement of the pressure plate under, or opposing, the influence of clutch compression springs interposed between the opposed faces of the cover and pressure plate.

It is an object of my invention to provide a friction clutch having a driving assembly the major elements of which are so arranged as to minimize noise brought about through vibration transmitted to the assembly during clutch operation.

A further object is to provide an improved driving assembly for friction clutches wherein the pressure plate, the springs and cover are so formed and arranged one relative to the other, as to place the pressure plate and cover under relative torque, thereby to maintain, at all times, one wall of each of the pressure plate lugs and one wall of each of the openings through the cover plate yieldingly in contact.

Other objects, the advantages and uses of the invention will become apparent after reading the following specification and claims, and after consideration of the drawings forming a part of the specification wherein:

Fig. 1 is a vertical, sectional view of a friction clutch embodying the features of my invention.

Fig. 2 is a rear plan view of the clutch illustrated in Fig. 1.

Fig. 3 is a sectional view along the line 3—3 of Fig. 2 and

Figure 4:
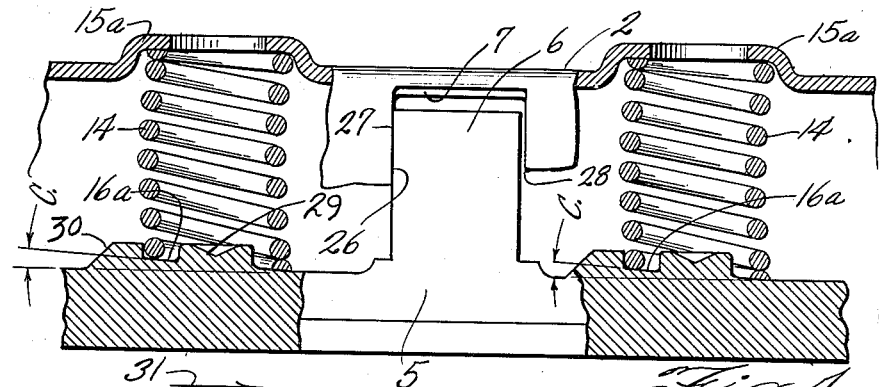
Figs. 4, 5 and 6 are views similar to Fig. 3 illustrating other forms of the invention.

Referring to Figs. 1 and 2, I have illustrated therein, a clutch embodying features of my invention which clutch comprises a stamped sheet metal cover 2 which may be fixed, as by means of bolts 3, to the fly wheel 4 of a motor vehicle engine. An annular pressure plate 5, located within the cover 2, and having its face directed toward the adjacent face of the fly wheel 4 is formed with integral lugs 6 extending rearwardly therefrom and each extending partially through openings 7 formed in the sidewall of the cover 2. The driven assembly of the clutch may comprise a driven disc 8 having facing 9 on its outer peripheral portion which disc may be carried directly upon the shaft 10 forming a part of the motor vehicle transmission assembly (not shown). Compression springs of the coil type, as indicated at 14, are interposed between the cover 2 and adjacent surface of the pressure plate 5. In order that the ends of the springs 14 may be located properly with respect to the cover 2, depressions 15 may be formed on the inner wall of the cover to receive and locate the ends of the springs. The opposite ends of the springs 14 may rest upon surfaces 16 on the rearward face of the pressure plate 5.

Means for urging the pressure plate 5 rearwardly against the compression of the springs 14, to release the clutch may comprise a plurality of levers 18 each pivotally mounted at 19 upon a bolt 21, carried by the cover 2 as shown. One end of each of the levers may engage with a clutch release collar 20 and the opposite end may be connected through a strut 22 with a portion 23 of the adjacent pressure plate lug 6, whereby movement of the collar 20, as by actuation of the clutch pedal operating arm 24, will cause the levers to move about their pivots 19 thus to retract the pressure plate.

Referring now to Fig. 3, it will be noted that the depressions 15, formed in the cover 2, have their inner walls inclined relative to the rear wall of the cover and to the plane of the pressure plate by an angle indicated at "A". The angle "A" may be dependent somewhat upon the length of the springs 14. I prefer to employ for the clutch shown an angle within the range of 5° to 10°.

In order that the opposite ends of the springs 14 may not move laterally relative to the pressure plate 5, I provide bosses 29 and 30 on the rear face of the pressure plate, the bosses 30 being arranged in annular array, one group of three about each of the bosses 29 and each group in register with the ends of one of the springs as shown in Figs. 3 and 4 of U. S. Patent No. 1,839,590.

With reference to Fig. 3, it will be apparent that the angle "A", representing the angle at which the seats for the springs 14 on the cover plate 2 lie relative to the opposite spring seats 16 on the rearward face of the pressure plate 5, will cause the springs 14 to be distorted in such manner as to urge the cover and pressure plate to move relative to one another about their axis of rotation thus causing the wall 26 of the opening 7 of the cover plate 2 to contact with the surface 27 of the lug 6 on the pressure plate 5, thereby to leave a space 28 between the opposite side of the lug 6 and the opening wall. It is by this means that I maintain the pressure plate in constant driving relationship with the cover 2 and yieldably take up any backlash which may exist between the sides of the lugs 6 and the walls of openings 7. The direction of rotation of the cover 2 is indicated by the arrow 31.

So long as the surfaces 27 and 26 maintain yielding engagement, one with the other, under the influence of the springs 14 as described, noises due to intermittent contact between the lugs and cover 2, which may otherwise occur in a driven assembly of this character, will be minimized. The absence of such intermittent contact will also result in less wear upon the contacting surfaces of the lugs and cover plate.

In Fig. 4 I have shown another embodiment of the invention wherein the depressions 15a are formed with their inner surfaces parallel with the rear wall of the cover 2 and the pressure plate 5. In this form of the construction I provide an inclined seat 16a on the rearward face of the pressure plate 5 having an inclination relative to the rear surface of the plate 5 represented by the angle "C" which may be approximately equal to the angle "A" of Fig. 3. This arrangement results also in distortion of the springs 14 with the results attributable to the construction described in connection with Fig. 3.

Figure 5:
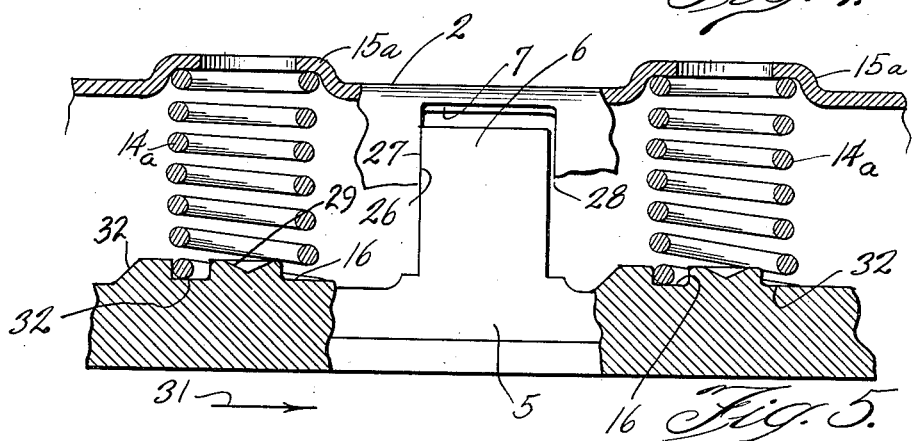

In Fig. 5 another embodiment of the invention is illustrated wherein the opposed surfaces of the depressions 15a and spring supporting faces 16 on the rear wall of the pressure plate 5 are parallel and in which the springs 14a are formed with their ends out of parallel by an angle equal to the angle "A" heretofore described. Compression of the springs 14a between the parallel supporting surfaces of the cover 2 and pressure plate 5 results in distortion of each spring in such manner as to urge the cover and plate to rotate relative to one another as described in connection with Figs. 3 and 4.

Figure 6:
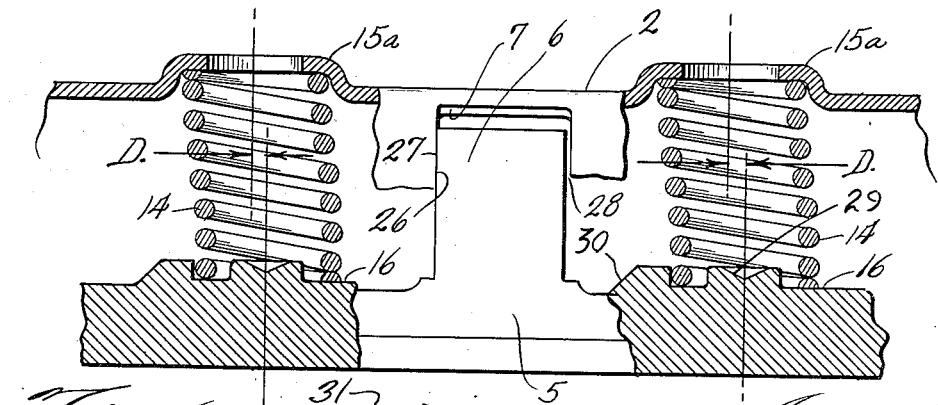

In Fig. 6, there is illustrated another embodiment of the invention wherein the inner surfaces of the depressions 15a and surfaces 16 are parallel but wherein the central axes of the depressions and opposed bosses 29 are offset circumferentially of the assembly by a distance equal to "D". In the structure shown the distance "D" may be one-eighth of an inch. This arrangement causes the springs 14 to be distorted to urge relative rotation of the cover plate 2 and pressure plate 5 in the same direction as indicated with respect to Figs. 3 to 5 inclusive and with the same results.

I claim as my invention:

1. In a friction clutch, a cover plate, a pressure plate disposed within the confines of the cover plate, said cover plate having portions adapted to contact with portions of said pressure plate whereby to transmit torque from the former to the latter, said contacting portions being so arranged as to provide for axial movement of the pressure plate relative to the cover plate and compression springs interposed under compression between the opposed faces of the cover plate and pressure plate, and arranged relative thereto in such manner as to distort the springs when under compression to urge the opposite ends of each spring to shift out of axial alignment.

2. In a friction clutch, a cover plate, a pressure plate disposed within the confines of the cover plate, said cover plate having portions adapted to contact with portions of said pressure plate whereby to transmit torque from the former to the latter, said contacting portions being so arranged as to provide for axial movement of the pressure plate relative to the cover plate and compression springs interposed under compression between the opposed faces of the cover plate and pressure plate, the opposed spring supporting surfaces of the cover plate and the pressure plate being inclined relative to one another and the ends of said springs being normally parallel.

3. In a friction clutch, a cover plate, a pressure plate disposed within the confines of the cover plate, said cover plate having portions adapted to contact with portions of said pressure plate whereby to transmit torque from the former to the latter, said contacting portions being so arranged as to provide for axial movement of the pressure plate relative to the cover plate and compression springs interposed under compression between the opposed faces of the cover plate and pressure plate, the opposed spring supporting surfaces of the cover plate and pressure plate being parallel and the ends of the springs being disposed in planes that are inclined relative to one another when the springs are uncompressed.

4. In a friction clutch, a cover plate, a pressure plate disposed within the confines of the cover plate, said cover plate having portions adapted to contact with portions of said pressure plate whereby to transmit torque from the former to the latter, said contacting portions being so arranged as to provide for axial movement of the pressure plate relative to the cover plate and compression springs interposed under compression between the opposed faces of the cover plate and pressure plate, said cover plate having spring locating seats therein and similar seats being formed in said pressure plate, said seats being out of alignment circumferentially of said plates when the said contacting portions thereof are engaged.

5. In a friction clutch, a cover plate, a pressure plate disposed within the confines of the cover plate, said cover plate having portions adapted to contact with portions of said pressure plate whereby to transmit torque from the former to the latter, said contacting portions being so arranged as to provide for axial movement of the pressure plate relative to the cover plate and compression springs interposed under compression between the opposed faces of the cover plate and pressure plate, the spring supporting surface on said pressure plate being parallel with the plane of the body thereof, the spring supporting surfaces of the cover plate being inclined relative to said plane, and the ends of said springs being normally parallel.

ARTHUR W. ANDERSON.